United States Patent

McGrath et al.

(10) Patent No.: US 6,726,448 B2
(45) Date of Patent: Apr. 27, 2004

(54) CERAMIC TURBINE SHROUD

(75) Inventors: Edward Lee McGrath, Easley, SC (US); Gregory S. Corman, Ballston Lake, NY (US); Anthony J. Dean, Scotia, NY (US); Mark Stewart Schroder, Hendersonville, NC (US); Chris Basil Jiomacas, Greenville, SC (US); Thomas Raymond Farrell, Simpsonville, SC (US); Kenneth Lorenzo Parks, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/144,851

(22) Filed: May 15, 2002

(65) Prior Publication Data

US 2003/0215328 A1 Nov. 20, 2003

(51) Int. Cl.⁷ ............................................... F01O 11/16
(52) U.S. Cl. .................... 415/173.3; 415/135; 415/139; 415/178; 415/200
(58) Field of Search ...................... 415/173.1, 173.3, 415/175, 177–178, 200, 135, 138, 139, 197

(56) References Cited

U.S. PATENT DOCUMENTS

| | | | |
|---|---|---|---|
| 3,966,356 A | * 6/1976 | Irwin | 415/173.3 |
| 4,087,199 A | 5/1978 | Hemsworth et al. | |
| 4,245,954 A | 1/1981 | Glenn | |
| 4,551,064 A | * 11/1985 | Pask | 415/116 |
| 4,728,257 A | * 3/1988 | Handschuh | 415/136 |
| 4,759,687 A | * 7/1988 | Miraucourt et al. | 415/127 |
| 5,552,215 A | * 9/1996 | Tredway et al. | 428/293.4 |
| 5,645,399 A | * 7/1997 | Angus | 415/178 |
| 6,113,349 A | 9/2000 | Bagepalli et al. | |
| 6,200,091 B1 | * 3/2001 | Bromann et al. | 415/173.1 |
| 6,315,519 B1 | 11/2001 | Bagepalli et al. | |
| 6,435,823 B1 | * 8/2002 | Schroder | 415/173.1 |
| 6,503,441 B2 | * 1/2003 | Corman et al. | 264/635 |

FOREIGN PATENT DOCUMENTS

JP  2-196109 A  * 8/1990  ................. 415/200

* cited by examiner

*Primary Examiner*—Christopher Verdier
(74) *Attorney, Agent, or Firm*—Nixon & Vanderhye PC

(57) ABSTRACT

A gas turbine having a metallic outer shroud and a ceramic inner shroud. The ceramic inner shroud being secured to the outer shroud by hooks carried on the outer shroud. The hooks on the outer shroud being coated with TBC. A pin and spring system being provided to hold the ceramic inner shroud against the forward hook of the outer shroud. An anti-rotation pin being provided to trap the aft bend of the ceramic inner shroud against the aft hook of the outer shroud. The gas turbine further including a damping spring and pin system, disposed between a heat shield, within the outer shroud, and the ceramic inner shroud, to provide damping of the inner shroud.

13 Claims, 3 Drawing Sheets

CERAMIC TURBINE SHROUD

BACKGROUND OF THE INVENTION

The invention relates to gas turbine shrouds, and, more particularly, to a gas turbine shroud made from ceramic material.

Industrial gas turbines typically have the first stage of the turbine section designed without flow guiding shrouds attached to the turbine airfoils, the static turbine shrouds perform the important function of maintaining the hot combustion gases in the proper annular area thus preserving the flow path pressure while the turbine airfoil can properly extract energy. The shroud performs this function by tightly controlling the clearance between the internal surface of the shroud and the tip of the turbine airfoil.

A conventional metallic turbine shroud has temperature limits that require gas turbine operating airflow to keep it cooled below its critical temperature limit. The source of this cooling air is from the compressor discharge that has not yet had energy from the combustor added to it. Diverting air for cooling the metallic turbine inner shroud, however, reduces gas turbine efficiency.

In addition a relatively large number of metallic inner shrouds are needed so that a relatively large number of expansion gaps between the inner shrouds, are available to negate the thermal expansion effects of the metallic inner shrouds.

BRIEF SUMMARY OF THE INVENTION

Replacing the metallic inner shrouds with higher temperature ceramic inner shrouds substantially reduces or even eliminates the need for the cooling airflow. Eliminating the need for cooling air to reduce shroud temperature allows more air to enter the combustor and have fuel energy added to it so that the turbine section can extract it. Because of this extra amount of combusted air, the gas turbine can extract more energy to drive the generator thereby creating more electrical energy output and at a higher gas turbine efficiency (simple & combined cycle). Thus, replacement of the current metallic inner shrouds with higher temperature capable composite ceramic shrouds serves to eliminate or reduce performance robbing cooling air.

Using ceramic shrouds having a higher temperature capability may also allow a fewer number of inner shrouds to be used than the current metallic design. The savings realized by the invention can include fewer number of parts, fewer leak paths, and higher firing temperature capability.

DETAILED DESCRIPTION OF THE INVENTION

Figure 1:
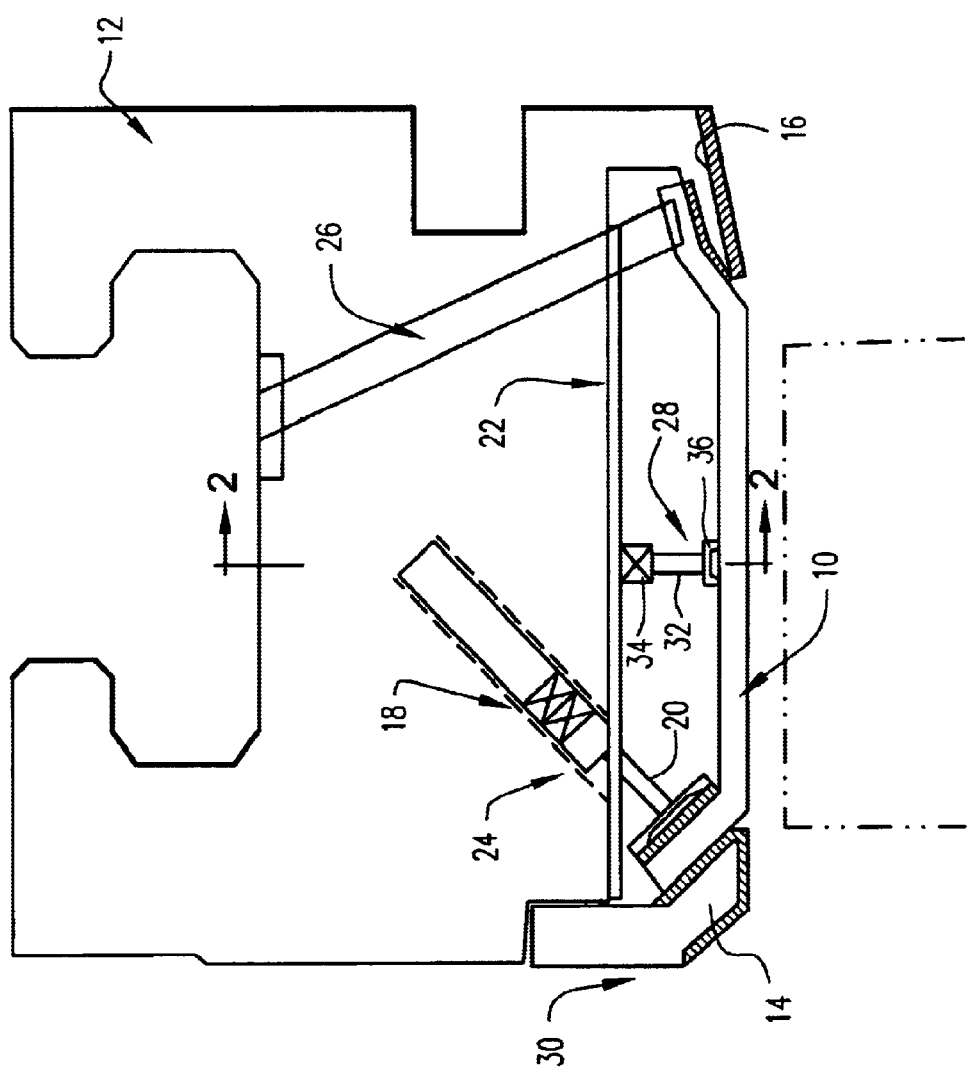
FIG. 1 is a cross-sectional view of an exemplary embodiment of the present invention.

FIG. 1 shows a cross-sectional view of the composite ceramic inner shroud design along the air flow direction of the gas turbine. Inner shroud 10 is made of Continuous Fiber Composite Ceramic (CFCC) material by using processing methods covered under other patents known to those skilled in the art. Outer shroud 12 can be made from metal. The forward and aft ends of inner shroud 10 are bent away from the flow path which is from left to right along inner shroud 10 in FIG. 1, while the shape of the surface along the flow path is identical to the current General Electric Corporation "F" class Gas Turbine stage 1 shroud profile.

Figure 2:
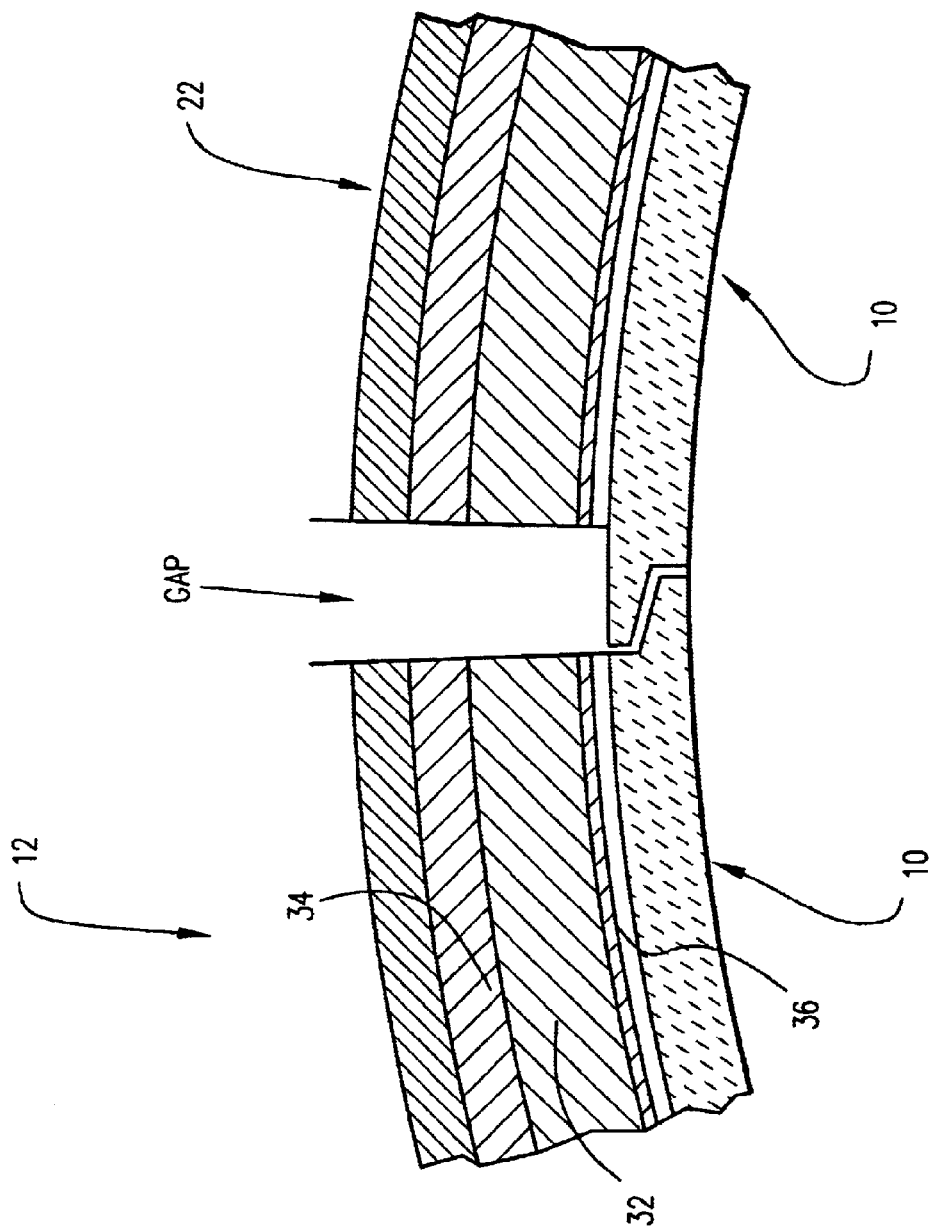
FIG. 2 is a partial cross-sectional view along lines 2—2 of FIG. 1.
Figure 3:
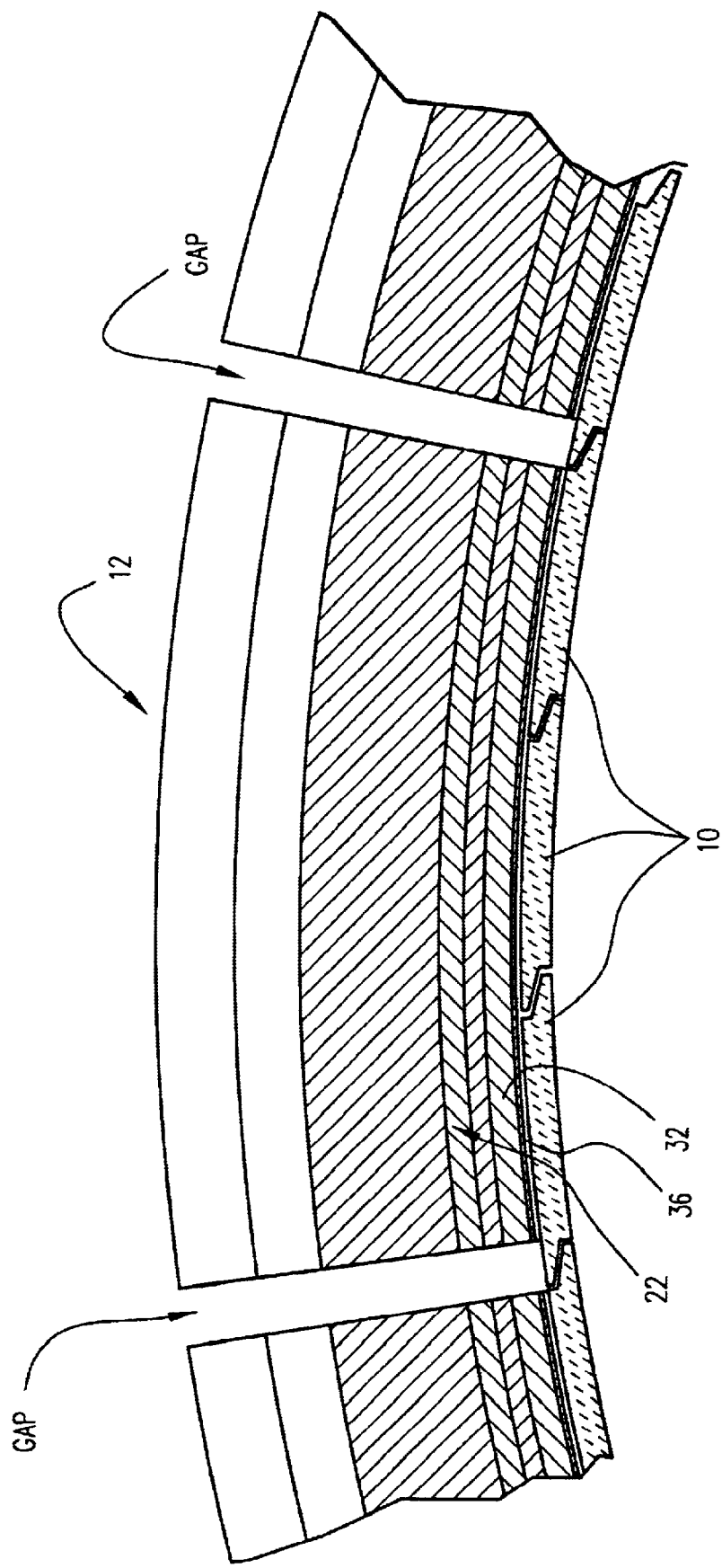
FIG. 3 is a circumferentially expanded cross-sectional view of FIG. 2.

As shown in FIGS. 2 and 3, typically, multiple inner shrouds are associated with one outer shroud 12. The inner shrouds 10 overlap each other to seal against the ingestion of hot combustion gasses. In FIG. 3, for example, there are shown three ceramic inner shrouds 10 for each metallic outer shroud 12. In practice, however, the invention could use less than three ceramic inner shrouds 10 per one metallic outer shroud 12, because the thermal expansion of CFCC is approximately ⅓ of its metallic counterpart. The outer shrouds 12 have a relatively larger gap between them than the inner shrouds 10 to allow for the greater expansion of the metallic outer shrouds 12.

Inner shroud 10 is secured by forward and aft hooks, 14 and 16 respectively, attached to outer shroud 12. Surfaces of forward and aft hooks 14 and 16 exposed to the flow path are provided with thermal barrier coating (TBC) to provide thermal insulation. The thin coating of TBC is applied to outer shroud 12 to act as a contact zone interface between metal components and the CFCC components. This is needed to prevent CFCC breakdown and erosion from contact with metallic ions.

Pin and spring system 18 holds inner shroud 10 against forward hook 14 of outer shroud 12. Pin and spring system 18 includes metallic pin 20 passing through outer shroud 12 and heat shield 22 down to the upper surface of the forward bend of inner shroud 10. The head of metallic pin 20 is also TBC coated to provide separation between metal and ceramic surfaces. Pin and spring system 18 includes seal ring 24 that functions similarly to an automotive piston ring to prevent hot combustion gases from reaching the spring arrangement. Heat shield 22 is necessary to protect the lower temperature alloy outer shroud 12 from hot combustion gases.

Metallic anti-rotation pin 26 traps the aft bend of inner shroud 10 against aft hook 16 of outer shroud 12. Anti-rotation pin 26 passes through outer shroud 12 and heat shield 22, and fits into a TBC coated depression in the top of the aft end of inner shroud 10. The insertion of pin 26 into the depression prevents lateral (circumferential) motion of the inner shroud 10.

Positioned between the center of the heat shield 22 and inner shroud 10 is damping spring and pin system 28 to provide damping of inner shroud 10. As shown in FIG. 1, damping spring and pin system 28 includes, pin 32, spring 34 and leaf seal 36. As can be more clearly seen in FIGS. 2 and 3 a plurality of damping spring and pin assemblies 28 are circumferentially disposed between inner shrouds 10 and heat shields 22.

Leaf seal 36 is incorporated with damping spring and pin system 28 to minimize the amount of hot combustion gasses by-passing the turbine tip. This seal is the same type as used on GE aircraft engines and the 9/7H Gas Turbine.

Additional functions performed by outer shroud 12 are to react axial loads from the stage 1 nozzle (not shown) and to provide a sealing surface for chordal hinge seal 30 of the stage 1 nozzle. Chordal hinge seal 30 seals against compressor discharge flow leaking into the gas stream. In addition to forming forward hook 14 for inner shroud 10, chordal hinge seal 30 performs the function of reacting stage 1 nozzle loads into outer shroud 12 and on into the outer case. Chordal hinge seal 30 also provides a surface for outer shroud 12 to seal against and is bolted on via countersunk bolt heads and staked into place (not shown).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine comprising:

a plurality of inner and outer shrouds wherein said plurality of inner shrouds are made of ceramic material;

each one of said plurality of outer shrouds having forward and aft hooks for securing certain ones of said plurality of inner shrouds to one of said plurality of outer shrouds; and a plurality of pin and spring systems for holding each one of said plurality of ceramic inner shrouds against said forward hooks of a corresponding one of said plurality of outer shrouds.

2. The gas turbine of claim 1 wherein said ceramic material is continuous fiber composite ceramic.

3. The gas turbine of claim 1 wherein said plurality of outer shrouds are made of metal and TBC coating is used at ceramic/metal interfaces.

4. The gas turbine of claim 1 further comprising a plurality of anti-rotation pins for securing each one of said plurality of ceramic inner shrouds against said aft hook of a corresponding one of said plurality of outer shrouds.

5. A gas turbine comprising:

a plurality of inner and outer shrouds wherein said plurality of inner shrouds are made of ceramic material;

a heat shield disposed within each one of said plurality of outer shrouds; and a plurality of damping spring and pin systems, each one of said plurality of damping springs and pin systems being provided between an inner surface of ones of said plurality of inner shrouds and said heat shield.

6. The gas turbine of claim 5, each one of said plurality of outer shrouds having forward and aft hooks for securing certain ones of said plurality of inner shrouds to one of said plurality of outer shrouds.

7. The gas turbine of claim 4 wherein surfaces of said forward and aft hooks are coated with TBC.

8. The gas turbine of claim 6 further comprising a plurality of anti-rotation pins for securing each one of said plurality of ceramic inner shrouds against said aft hook of a corresponding one of said plurality of outer shrouds.

9. The gas turbine of claim 5 wherein said ceramic material is continuous fiber composite ceramic.

10. The gas turbine of claim 5 wherein said plurality of outer shrouds are made of metal and TBC coating is used at ceramic/metal interfaces.

11. A gas turbine comprising:

a metallic outer shroud including forward and aft hooks;

a ceramic inner shroud;

a pin and spring system for holding said ceramic inner shroud against said forward hook of said metallic outer shroud;

an anti-rotation pin for securing said ceramic inner shroud against said aft hook of said metallic outer shroud; and a damping spring and pin assembly secured between a heat shield disposed within said metallic outer shroud and an inner surface of said ceramic inner shroud.

12. The gas turbine of claim 11 wherein said ceramic inner shroud is made of continuous fiber composite ceramic material.

13. The gas turbine of claim 11 wherein TBC coating is provide at ceramic/metal interfaces.

* * * * *

UNITED STATES PATENT AND TRADEMARK OFFICE
CERTIFICATE OF CORRECTION

PATENT NO. : 6,726,448 B2
DATED : April 27, 2004
INVENTOR(S) : McGrath et al.

It is certified that error appears in the above-identified patent and that said Letters Patent is hereby corrected as shown below:

Column 3,
Line 22, "forward hooks" and insert -- forward hook --.

Column 4,
Line 2, delete "said plurality of damping springs and pin systems" and insert -- said plurality of damping spring and pin systems --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,726,448 B2 |
| APPLICATION NO. | : 10/144851 |
| DATED | : April 27, 2004 |
| INVENTOR(S) | : McGrath et al. |

It is certified that error appears in the above-identified patent and that said Letters Patent is hereby corrected as shown below:

In Column 1, line 3, immediately below the title, insert:

--The Government of the United States of America has rights in this invention pursuant to Contract No. DE-FC21-95MC31176 awarded by the U. S. Department of Energy.--

Signed and Sealed this

Thirtieth Day of January, 2007

JON W. DUDAS
*Director of the United States Patent and Trademark Office*